United States Patent
Muller-Brodmann et al.

(10) Patent No.: US 8,684,603 B2
(45) Date of Patent: Apr. 1, 2014

(54) SLIDING PULG AND SLIDING ELEMENT

(75) Inventors: Martin Muller-Brodmann, Wettenberg (DE); Alexander Schloss, Kirtorf (DE)

(73) Assignee: Federal-Mogul Deva GmbH, Stadtallendorf (DE)

( * ) Notice: Subject to any disclaimer, the term of this patent is extended or adjusted under 35 U.S.C. 154(b) by 82 days.

(21) Appl. No.: 13/256,004

(22) PCT Filed: Mar. 10, 2010

(86) PCT No.: PCT/EP2010/053036
§ 371 (c)(1),
(2), (4) Date: Sep. 12, 2011

(87) PCT Pub. No.: WO2010/103041
PCT Pub. Date: Sep. 16, 2010

(65) Prior Publication Data
US 2011/0317947 A1 Dec. 29, 2011

(30) Foreign Application Priority Data
Mar. 11, 2009 (DE) .......................... 10 2009 001 495

(51) Int. Cl.
*F16C 33/02* (2006.01)
(52) U.S. Cl.
USPC .......................................................... 384/42
(58) Field of Classification Search
USPC ........... 384/281, 282, 284, 285, 286, 293, 42, 384/26
See application file for complete search history.

(56) References Cited

U.S. PATENT DOCUMENTS

| | | | | | |
|---|---|---|---|---|---|
| 77,012 | A | * | 4/1868 | Derlon | 508/102 |
| 138,641 | A | * | 5/1873 | Gwyn | 384/282 |
| 138,644 | A | * | 5/1873 | Gwyn | 384/282 |
| 174,331 | A | * | 2/1876 | White | 384/282 |
| 3,436,129 | A | * | 4/1969 | James | 384/36 |
| 4,342,491 | A | * | 8/1982 | Jamison et al. | 384/286 |
| 4,932,640 | A | * | 6/1990 | Shirakawa | 269/32 |
| 5,927,860 | A | * | 7/1999 | Buse | 384/122 |
| 6,070,562 | A | * | 6/2000 | Van Bezeij | 123/195 R |
| 6,896,411 | B2 | * | 5/2005 | Lee | 384/285 |
| 7,470,065 | B2 | * | 12/2008 | Stadlmayr et al. | 384/285 |
| 2008/0178430 | A1 | | 7/2008 | Berthiaume | |

FOREIGN PATENT DOCUMENTS

| | | |
|---|---|---|
| CH | 684 124 A5 | 7/1994 |
| DE | 19 23 497 A1 | 11/1969 |
| DE | 86 06 095 U1 | 4/1986 |
| DE | 10 2007 025239 A1 | 12/2008 |
| JP | 11 351260 A | 12/1999 |

* cited by examiner

*Primary Examiner* — Phillip A Johnson
(74) *Attorney, Agent, or Firm* — Robert L. Stearns; Dickinson Wright, PLLC

(57) ABSTRACT

The invention relates to a sliding plug and to a sliding element. The sliding plug, which is inserted into a carrier body of a sliding element, comprises a circumferential surface that has at least one rib extending in the direction of the longitudinal axis of the sliding plug. The sliding element, which is provided with such sliding plugs, preferably comprises a receiving hole having a small-diameter section and having a large-diameter section.

17 Claims, 4 Drawing Sheets

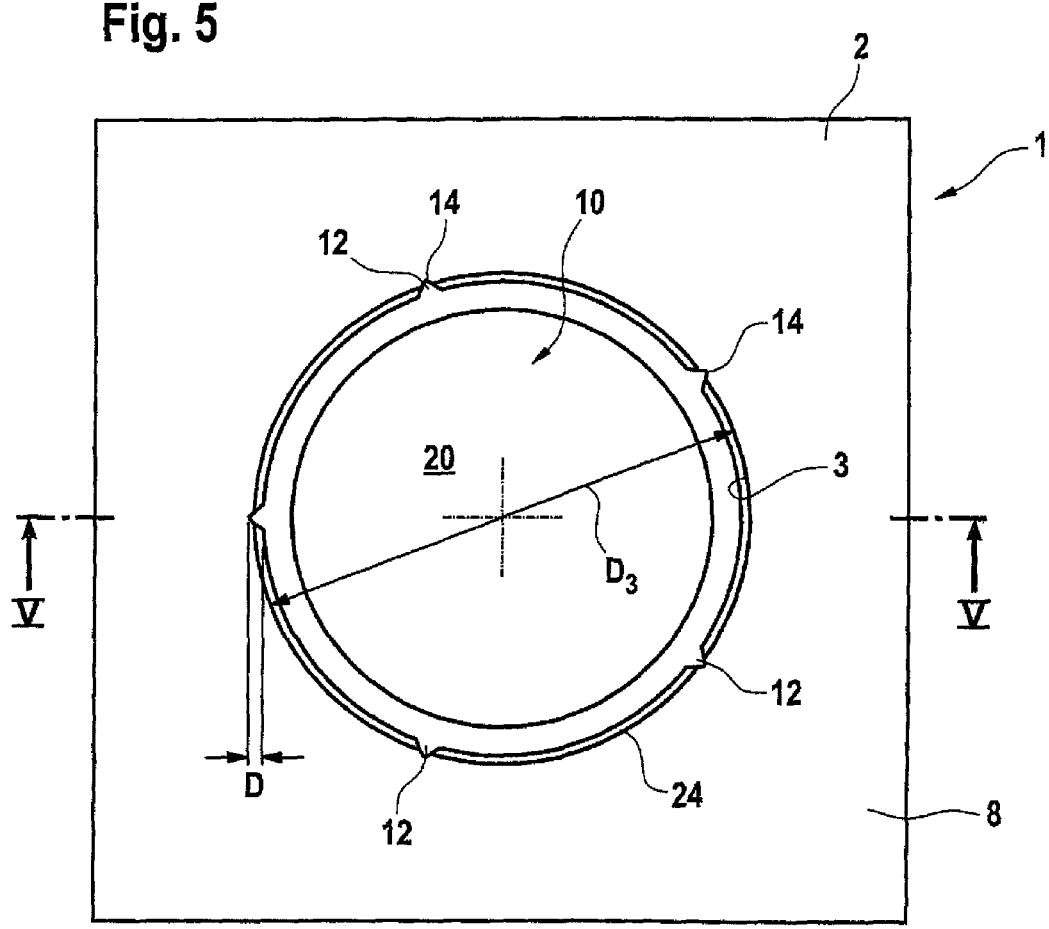

SLIDING PULG AND SLIDING ELEMENT

BACKGROUND OF THE INVENTION

1. Technical Field

Figure 1:
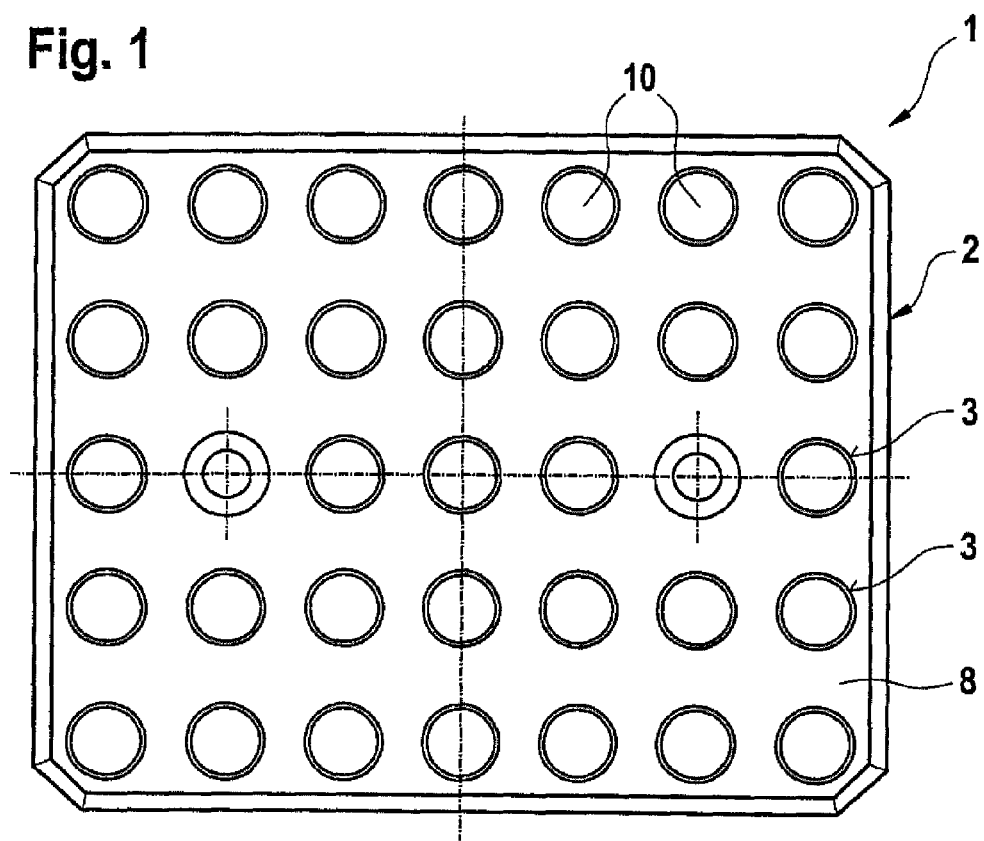

The invention relates to a wear plug for inserting into the carrier of a slide element with one end facing towards a slide partner and a peripheral surface. The invention also relates to a slide element with a carrier comprising a wear surface and at least one mounting borehole in which a plug of this nature is inserted.

2. Related Art

Slide bearing systems made up of slide elements are generally used to reduce the friction generated by the relative movements of two machine components. If these slide bearing systems do not have oil or grease lubrication, bearing materials with included solid lubricants are generally used. This means, for example, that wear plugs which contain this solid lubricant can be inserted into a carrier. Particularly for high temperature applications it is beneficial if the plugs themselves are made of a mixture of metal and solid lubricant.

The disadvantages of these systems are the different thermal coefficients of expansion of support bodies and wear plugs as well as the different oxidation properties of the material used for the carrier and the plug material.

The stresses which occur during operation as a result of the different changes in diameter caused by the differences in the thermal expansion and oxidation properties result in enormous pressure stresses with the consequence that the plug material suffers cracking. As a result of this cracking it is possible that the wear plugs may fall out of the actual mounting borehole in the carrier due to the plugs becoming fractured.

Therefore the slide stoppers made by produced in the slide shoes of aluminium pusher furnaces with stepped diameters. The corresponding mounting borehole in the carrier is also stepped. The dimensions of the wear plugs are considerably less than those of the mounting borehole but are prevented from falling out of the boreholes by the thicker collar diameter.

Mechanical machining is required to produce these stepped diameters on the wear plugs. The production of a stepped geometry made in a press is not a reliable process using these materials since the high level of solid lubricant means that there is an extreme risk of cracking on the blank at the point of transition from the larger to the smaller diameter.

SUMMARY OF THE INVENTION

Therefore the aim of the invention is to produce a wear plug which is easy to manufacture, is held securely in its mounting boreholes and suffers as little cracking as possible during operation.

This aim is achieved by a wear plug whose peripheral surface features at least one rib extending along the longitudinal axis of the wear plug.

The peripheral surface forms the majority of the circumference whilst the rib or ribs take up the minority of the circumference.

It has been found that the rib or ribs in the wear plug can hold the plug in the mounting borehole and that there is sufficient space left between the ribs in which the wear plug can expand without this causing excessive pressure stress and cracking. There is no need for a stepped edge which therefore simplifies the production process. The rib or ribs are created or in other words formed during the production of the plug.

The wear plugs can be manufactured with a completely uniform cross-section by powder metallurgy methods and do not require any retrospective mechanical machining.

Ideally a maximum of ten ribs is used. Limiting the number of ribs to ten is expedient to ensure that sufficient free space is left between the ribs in which the wear plug can expand during operation.

Ideally three to five ribs are formed on the peripheral wall of the plug.

At least one rib is opposite the peripheral surface facing the outside. The rib is positioned such that it faces outwards.

The ribs are ideally distributed evenly over the peripheral surface which has the benefit that pressure stresses during operation are also evenly distributed around the wear plug so as to prevent cracking caused by local overloads.

Ideally the ribs have a triangular, a semi-circular or a trapezoidal cross-section.

Ideally the wear plug has a cylindrical form with a casing surface wherein the rib is located on the casing surface of the cylinder. The rib is positioned such that it faces outwards wherein the vertex of the rib defines a peripheral circle which has a diameter $D_2$. The cylindrical casing surface has a diameter of $D_1$ wherein $D_1 < D_2$.

The thickness D of the rib is ideally 2% to 4% of the diameter $D_1$ of the peripheral surface of the wear plug, in particular the diameter $D_1$ of the cylindrical casing.

The smaller the thermal coefficient of expansion of the wear plug material, the smaller the thickness D can be selected.

The wear plug material ideally has a matrix consisting of chrome-nickel-steel wherein solid lubricant is included in the matrix.

Ideally the rib extends over at least 50% of the length of the plug. Its extension over the full length of the plug is preferred because this simplifies the production process for the wear plug. Further machining may be required in certain circumstances if the ribs are shorter in length.

The wear plug may have a peripheral chamfer on its end. This chamfer provides the benefit that it is easier to insert the wear plug into the support material. It is also possible to have a chamfer on the edge of the mounting borehole.

The slide element proposed by the invention is fitted with the wear plug proposed by the invention.

The mounting borehole ideally has a small diameter section and a large diameter section wherein the large diameter section faces away from the wear surface.

The rib on the wear plug extends at least over the length of the small diameter section. This has the benefit that a section of the rib is also in the large diameter section. Whilst the rib in the smaller diameter section deforms during operation and in certain circumstance may be fully dissolved, the rib in the large diameter section is maintained and forms a buttress at the transition point to the small diameter section so that this buttress enables the wear plug to be supported on the shoulder of the ring between the small diameter and large diameter sections.

The diameter $D_2$ of the casing of the ribs is ideally larger than the diameter $D_3$ of the small diameter section. Ideally there is a slight overlap in the range of 0.1 to 0.5 mm. This ensures that as the wear plug is pressed in, the tip of the rib is slightly flattened. In the large diameter section of the mounting borehole which in the current situation was designed to hold a collar, the ribs are not deformed and instead retain their original geometry. The insertion forces are therefore relatively low overall.

Ideally the diameter of the cylindrical casing is less than the diameter of the small diameter section.

During operation in an oxidising atmosphere whose temperature is typically around 620° C., the diameter of the wear plug which is ideally made of chrome nickel steel will undergo the expected expansion relative to the diameter of the borehole. The available volume proposed by the invention between the actual plug diameter, in other words excluding the rib contour, corresponds to the previous play and ensures the required expansion volume for the wear plug.

At operating temperature the plastic ribs may easily undergo plastic deformation but even in the event of such deformation of the ribs in the pressure area the remaining overlap between the exposed ribs in the larger diameter zone of the plug secures the plug to ensure that it does not fall out, particularly when it is cold.

The carrier is ideally made of grey cast iron. Grey cast iron offers the benefit that the free graphite content also has a lubricating effect.

THE DRAWINGS

Figure 2:
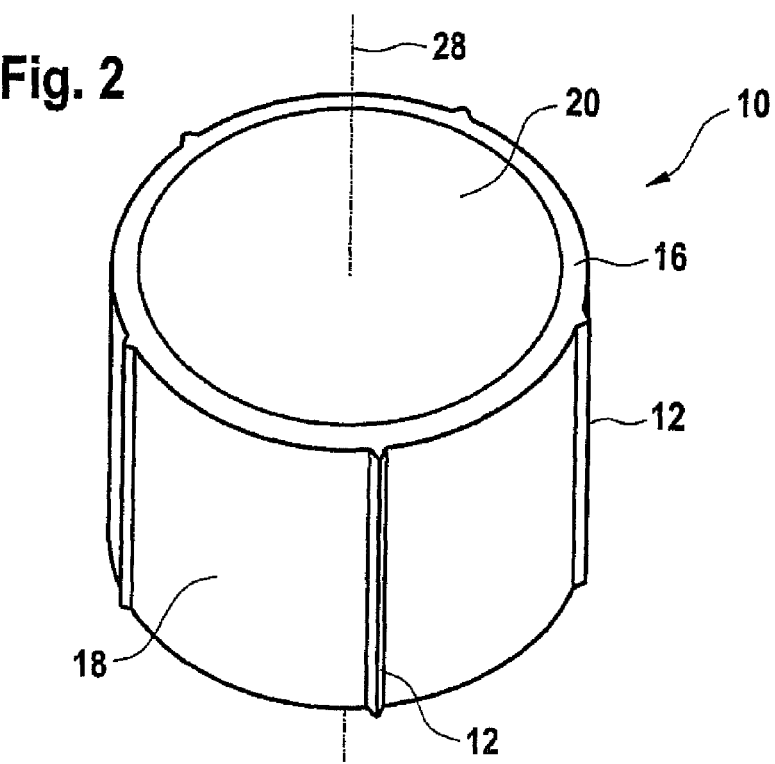
Figure 3:
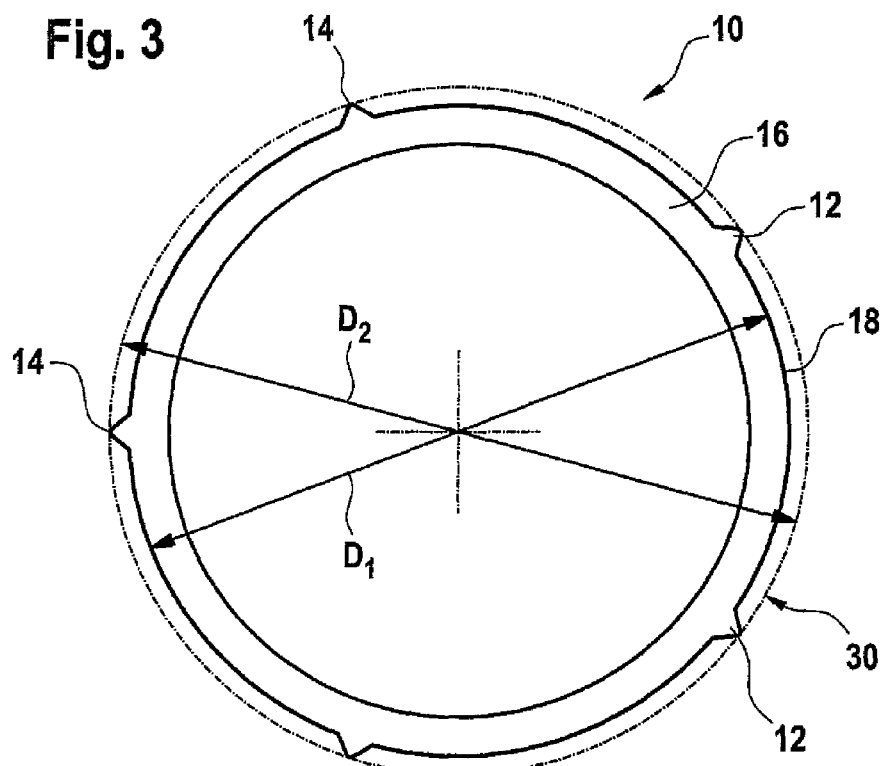
Figure 4A:
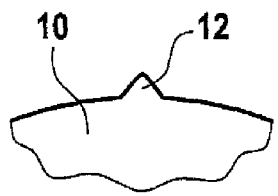
Figure 4B:
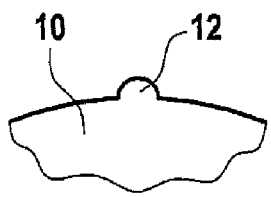
Figure 4C:
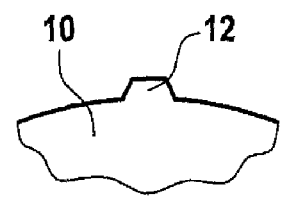
Figure 6:
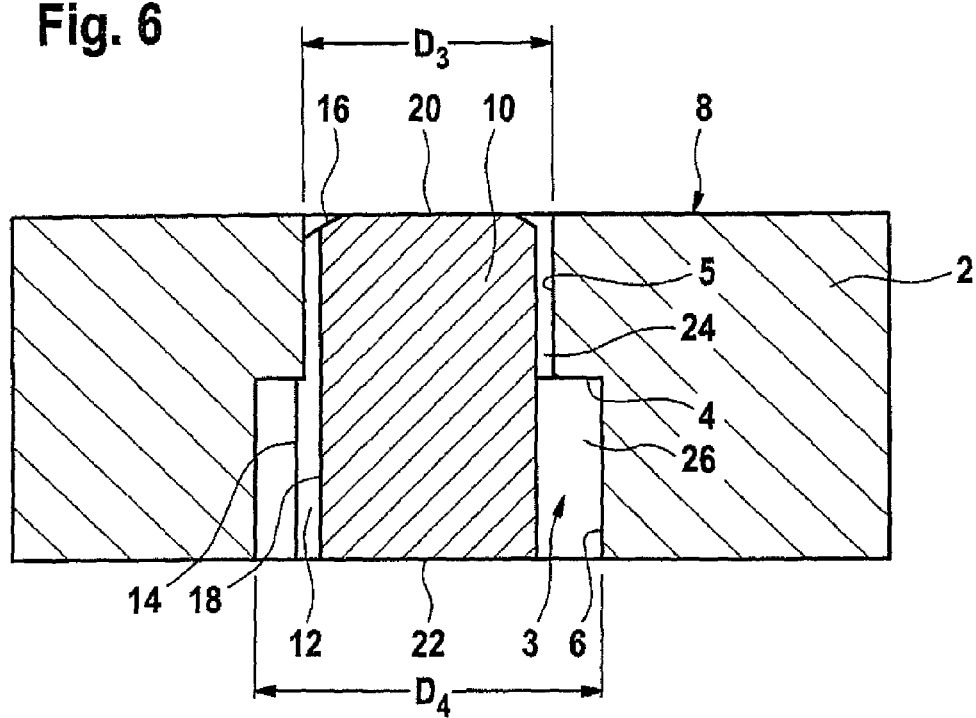
Figure 7:
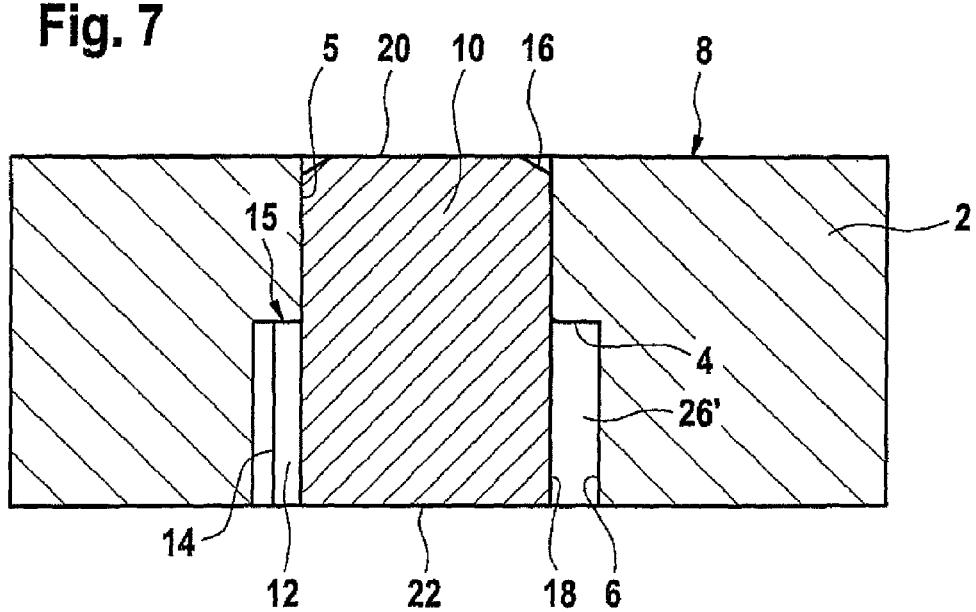

Specimen designs of the invention are described in the following in more detail on the basis of the drawings which show the following:

FIG. 1 A plan view of a slide element which is fitted with a large number of wear plugs FIG. 2 A perspective view of a plug FIG. 3 A plan view of a wear plug FIG. 4a, b, c Detail views of rib geometries FIG. 5 An enlarged view of an inserted wear plug in a carrier before operation FIG. 6 A section through the wear plug from FIG. 4 along the liven V-V FIG. 7 A section corresponding to the section shown in FIG. 5 for a plug during operation.

DETAILED DESCRIPTION

FIG. 1 shows the plan view of the wear surface 8 of a slide element 1 which has several rows of holes containing mounting boreholes 3 in its carrier 2. Wear plugs 10 are inserted in the mounting boreholes 3. The slide element 1 is a panel-shaped element.

FIG. 2 shows perspective view of a wear plug 10 of this type. The wear plug 10 has a cylindrical design and on its peripheral surface, in other words on its casing surface, it has a total of five ribs 12. The ribs 12 are evenly distributed over the casing surface 18 and extend parallel to the longitudinal axis 28 of the wear plug 10. The end 20 has a chamfer 16 at its edge.

FIG. 3 shows a plan view of the end 20 of the wear plug 10 shown in FIG. 2. The diameter of the cylindrical casing is marked as $D_1$. In addition the figure shows the casing of the ribs 12 which runs through the vertex or tips 14 of the triangular ribs 12. The casing 30 has a diameter $D_2$ which is large than diameter $D_1$.

FIGS. 4a, b and c show three different rib geometries with triangular shaped, semi-circular and trapezoidal cross-sections.

FIG. 5 shows a wear plug 10 with five ribs 12 inserted in a carrier 2 of a slide element 1. It can be seen that diameter $D_1$ is less than diameter $D_3$ of the small diameter section 5 of the mounting borehole 3 (see also FIG. 6). This forms a ring gap 24. The thickness D of the ribs 12 which is produced from D2−D1 is larger than the width of the ring gap 24. This means that diameter $D_2$ is larger than the diameter $D_3$. For a wear plug 10 with an example diameter of $D_1$ of 25 mm to 30 mm the thickness D of the ribs can be selected at D=0.5 mm.

When designing the thickness D it is also recommend that you take the thermal coefficient of expansion of the wear plug material into account so that no excessive pressure stresses occur under the influence of heat which could destroy the wear plug. This means that the greater the thermal coefficient of expansion of the wear plug material, the greater D should be.

During the insertion process the tips 14 grip on to the internal surface of the mounting borehole 3 where they undergo minor deformation or they cause minor deformation to the internal surfaces of the mounting borehole 3. This is only shown in schematic form in FIG. 5.

FIG. 6 shows a section along the line V-V through the slide element 1 shown in FIG. 5. It can be seen that the mounting borehole 3 has a small diameter section 5 at the top which has a diameter $D_3$ and a large diameter section 6 below this with diameter $D_4$. Between these two sections 5 and 6 the mounting borehole 3 has a ring shoulder 4.

The wear plug 10 is inserted into the mounting borehole 3 wherein the ring gap 24 between the casing surface 18 and the internal surface of the small diameter section 5 remains clear.

It can also be seen that the rib 12 in the small diameter section 5 is slightly deformed so that the tip 14 is somewhat flattened. The large diameter section 6 which has a much larger diameter than the casing $D_2$, features a ring chamber 26 which is so large that the tip 14 of the rib 12 is also kept at a distance from the internal surface of the large diameter section 6. This means that there is enough space in the two sections 5 and 6 for the wear plug 10 to expand during operation.

FIG. 7 shows the operating situation. It can be seen that the cylindrical part of the plug 10 has expanded in the effects of heat to such an extent that it reaches the dimensions of the small diameter section 5. This means that the ribs 12 can completely disappear in this area if this is required to reduce the stress. The ribs 12 in the large diameter section 6 are maintained wherein a buttress surface 15 is formed on the ribs near the shoulder 4 which prevents the wear plug 10 from falling out of the mounting borehole 3 even when it is cold.

In the view shown the diameter differences are shown in exaggerated form. The diameter difference may be restricted to the clamping volume.

The wear plug 10 cannot fall out downwards because the base area 22 is supported on a machine parts which is not shown, The ring chamber 26 has reduced in size during operation to ring chamber 26'.

The invention claimed is:

1. Wear plug for inserting into a carrier of a slide element, wherein the wear plug comprises one end facing towards a slide partner and a peripheral surface extending around a longitudinal axis, and a plurality of ribs formed monolithic with the peripheral surface of the wear plug, the ribs being spaced from one another by the peripheral surface and each extending along the direction of the longitudinal axis of the wear plug and facing the outside with respect to the peripheral surface, wherein the peripheral surface and the ribs of the wear plug together present a perimeter extending continuously around the longitudinal axis, and the peripheral surface between the ribs takes up a majority of the perimeter.

2. Wear plug of claim 1, wherein there are a maximum of ten ribs.

3. Wear plug of claim 2, wherein the ribs are evenly distributed around the peripheral surface.

4. Wear plug of claim 2, wherein the ribs have a triangular, semi-circular or trapezoidal cross-section.

5. Wear plug of claim 1, wherein the peripheral surface of the wear plug has a cylindrical form.

6. Wear plug of claim 1, wherein the thickness of the at least one rib is 2% to 4% of the diameter of the peripheral surface of the wear plug.

7. Wear plug of claim 1, wherein the material of the wear plug comprises a matrix of chrome nickel steel with included solid lubricant.

8. Wear plug of claim 1, wherein the at least one rib extends over at least 50% of the length of the wear plug.

9. Wear plug of claim 8, wherein the at least one rib extends over the full length of the wear plug.

10. Slide element including the carrier with a wear surface and with at least one mounting borehole in which the wear plug of claim 1 is inserted.

11. Slide element of claim 10, wherein the mounting borehole has a small diameter section and a large diameter section.

12. Slide element of claim 11, wherein a diameter of at least one of the ribs is larger than a diameter of the small diameter section.

13. Slide element of claim 11, wherein the carrier is made of grey cast iron.

14. Slide element of claim 10 including a carrier with a wear surface and with at least one mounting borehole in which a wear plug is inserted, the wear plug comprising one end facing towards a slide partner and a peripheral surface, wherein the peripheral surface of the wear plug has at least one rib extending along the direction of the longitudinal axis of the wear plug, and wherein the at least one rib extends at least over the length of the small diameter section.

15. Slide element including a carrier with a wear surface and with at least one mounting borehole in which a wear plug is inserted, wherein the mounting borehole has a small diameter section and a large diameter section and the large diameter section faces away from the wear surface, and the wear plug comprises one end facing towards a slide partner and a peripheral surface, wherein the peripheral surface of the wear plug has at least one rib extending along the direction of the longitudinal axis of the wear plug.

16. Slide element including a carrier with a wear surface and with at least one mounting borehole in which a wear plug is inserted, wherein the mounting borehole has a small diameter section and a large diameter section, a diameter $D_2$ of a casing of the at least one rib is larger than a diameter $D_3$ of the small diameter section, the diameter $D_2$ of the casing is smaller than a diameter $D_4$ of the large diameter section, and the wear plug comprises one end facing towards a slide partner and a peripheral surface, wherein the peripheral surface of the wear plug has at least one rib extending along the direction of the longitudinal axis of the wear plug.

17. Slide element including a carrier with a wear surface and with at least one mounting borehole in which a wear plug is inserted, wherein the mounting borehole has a small diameter section and a large diameter section, a diameter $D_2$ of a casing of the at least one rib is larger than a diameter $D_3$ of the small diameter section, a diameter $D_1$ of the wear plug is smaller than the diameter $D_3$ of the small diameter section, and the wear plug comprises one end facing towards a slide partner and a peripheral surface, wherein the peripheral surface of the wear plug has at least one rib extending along the direction of the longitudinal axis of the wear plug.

\* \* \* \* \*

UNITED STATES PATENT AND TRADEMARK OFFICE
CERTIFICATE OF CORRECTION

PATENT NO.        : 8,684,603 B2
APPLICATION NO.   : 13/256004
DATED             : April 1, 2014
INVENTOR(S)       : Muller-Brodmann Page 1 of 1

It is certified that error appears in the above-identified patent and that said Letters Patent is hereby corrected as shown below:

Title page, item (54) and in the Specification, column 1, title, "PULG" should read "PLUG"

In the Claims

Column 5, line 2, "cylindrical form" should read "cylindrical"

Signed and Sealed this
Fifteenth Day of July, 2014

Michelle K. Lee
*Deputy Director of the United States Patent and Trademark Office*